Patented June 24, 1930

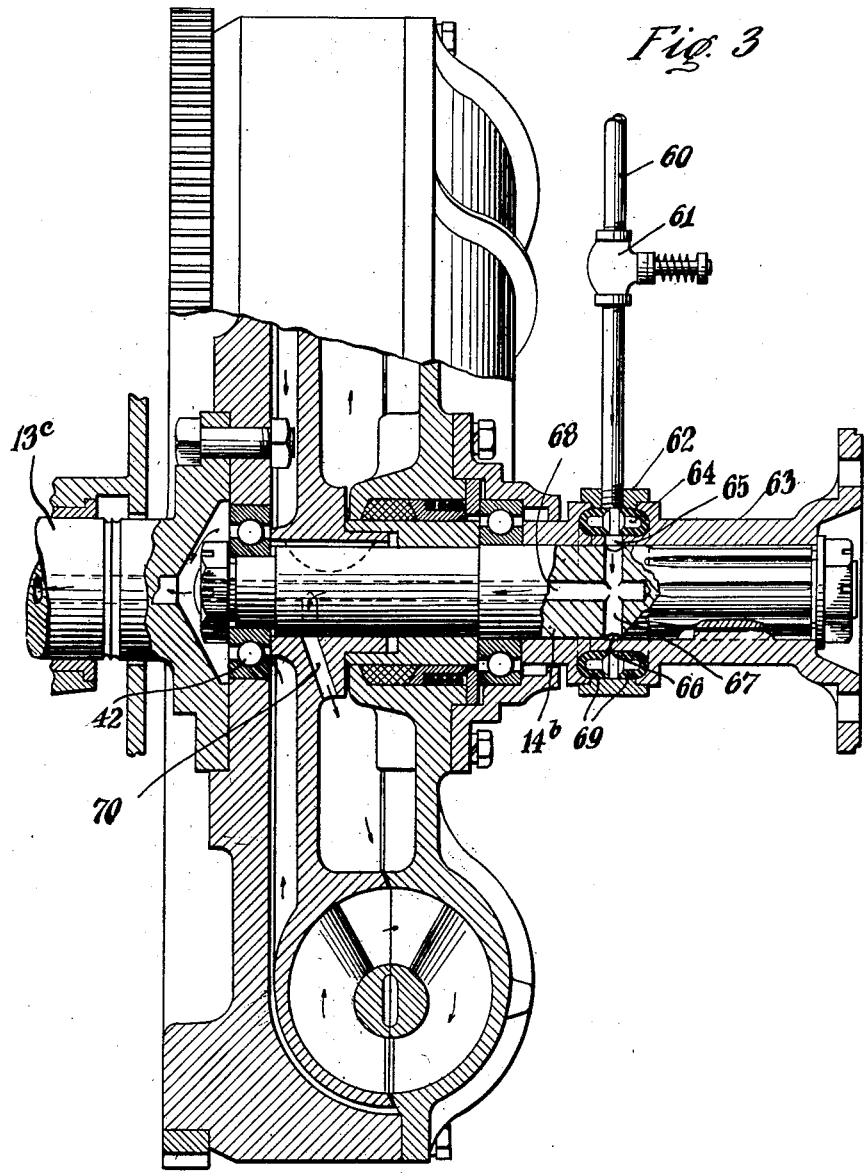

1,766,520

UNITED STATES PATENT OFFICE

GUSTAV A. KLIMEK, OF EAST RUTHERFORD, NEW JERSEY, ASSIGNOR TO TURBINE PATENTS CORPORATION, OF NEW YORK, N. Y., A CORPORATION OF DELAWARE

HYDRAULIC POWER TRANSMITTER

Application filed June 9, 1927. Serial No. 197,581.

This invention relates to power plants in which the power from an internal combustion engine is transmitted through a hydraulic power transmitter or fluid clutch of the type in which a pair of driving and driven members are each provided with an annular series of vanes, blades or passages, and the two members are so designed and so juxtaposed that the liquid in said passages causes the rotation of the driven member upon rotation of the driving member. Such a power transmitter is shown and broadly claimed in the Föttinger Patent 1,199,359 of September 26th, 1916.

The present invention is an improvement on the invention described and claimed in my Patent 1,640,608, issued August 30, 1927, on my co-pending application Serial No. 7,210, filed February 6, 1925, in which there is provided means for continuously conducting oil from the engine lubricating system to the interior of the transmitter to serve as the drive fluid of the latter.

Thus efficient operation of the transmitter is insured by maintaining the desired amount of liquid in the casing so as to compensate for any leakage which might result from high pressure under heavy load, centrifugal force at high speed, poor packing or other sealing means around one or both shafts, or other causes.

The main object of my present invention is to secure the direct delivery of the lubricating oil from the engine crank case to the transmitter without encountering the variable resistance offered by the bearing of the engine crank shaft.

In carrying out my invention one of the shafts of the transmitter is provided with means whereby oil from the crank case may be pumped to the interior of the transmitter without passing along a bearing surface of the shaft.

The same pump which delivers to the lubricating system is preferably employed for delivering to the transmitter and on its way to the transmitter the oil may pass through an oil purifier. As the oil for the transmitter and for the bearings comes from and returns to the same source, this purifier acts to purify the oil of the lubricating system, even though it is located only in the branch going to the transmitter.

The same pipe which delivers oil under pressure to a main bearing of the engine for lubrication of the latter, may also deliver to a passage in said shaft, leading to the transmitter.

This may be accomplished by providing an annular oil chamber around the shaft and communicating with a passage to the transmitter. Preferably the bearing is left unchanged and the annular oil chamber is made between the driving or the driven shaft of the transmitter and a collar surrounding the shaft.

In the accompanying drawings:

Fig. 3 is a central longitudinal section illustrating a third form of my invention.

Figure 1:
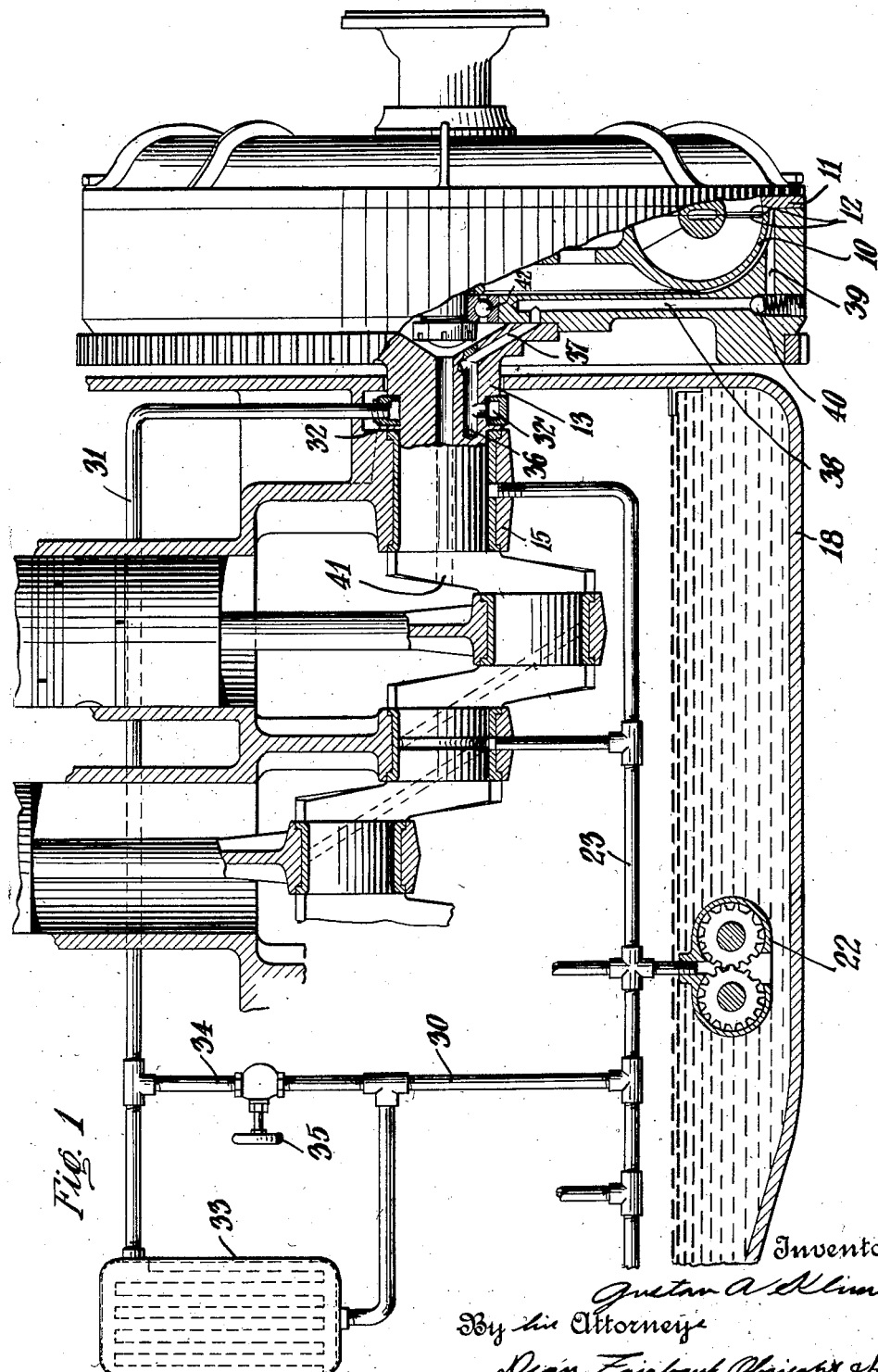
Fig. 1 is a view principally in central longitudinal section through a power transmitter and a portion of an engine connected thereto, and illustrates one embodiment of my invention.

The transmitter illustrated is similar to that illustrated in my prior application above referred to. It includes a pair of members 10 and 11 each having a series of blades 12 spaced to form an annular liquid circulating chamber, the inlets of the passages in one member being opposed to the outlets of the passages in the other member. The member 11 serves as the driving member or fluid impeller and the other member 10 as the driven member or turbine rotor. The driving member, which includes the casing of the transmitter is connected to the main crank shaft 13 of an internal combustion engine which shaft is mounted in a main bearing 15 in the crank case 18.

In the engine lubricating system illustrated the bearing 15 and the other bearings for the crank shaft are supplied with oil by a pump 22 and an oil delivery pipe 23. Each branch of the pipe 23 leads to a corresponding bearing surface at a point intermediate the ends of the latter.

In carrying out my invention, oil is conducted from the pipe 23 through a branch pipe 30 and a pipe 31 to a ring or collar 32 surrounding the shaft 13 adjacent to the transmitter. Between the pipes 30 and 31, an oil purifier 33 is interposed and to assure a sufficient supply of oil from the pipe 31 in case the oil purifier is clogged or for other reasons, I provide a by-pass 34 which may be closed by valve 35.

The ring or collar 32 encircles an annular oil passage or chamber 32' around the shaft. This passage is shown in the form of a groove in the collar but the groove might be in the shaft. The shaft is provided with a short longitudinal passage 36 communicating with the passage 32'. From this the oil may flow through passages 37, 38 and 39 in series to the interior of the transmitter. A check valve 40 may be provided to prevent backward flow of the oil through these passages in the event that the pressure from the pump side is decreased. The excess liquid from the transmitter is returned to the crank case of the engine in any suitable manner as for instance through a center passage 41 in the shaft 13.

It will thus be seen that in adapting a standard engine and standard hydraulic power transmission to incorporate my invention, it is not necessary to provide any additional circulating mechanism or expensive parts or members. It is merely necessary to provide an additional means for conducting oil from the pump of the lubricating system to a collar on the crank shaft of the engine and to drill various passages so that the oil is caused to flow to the interior of the transmitter, and the excess may return to the crank case.

Figure 2:
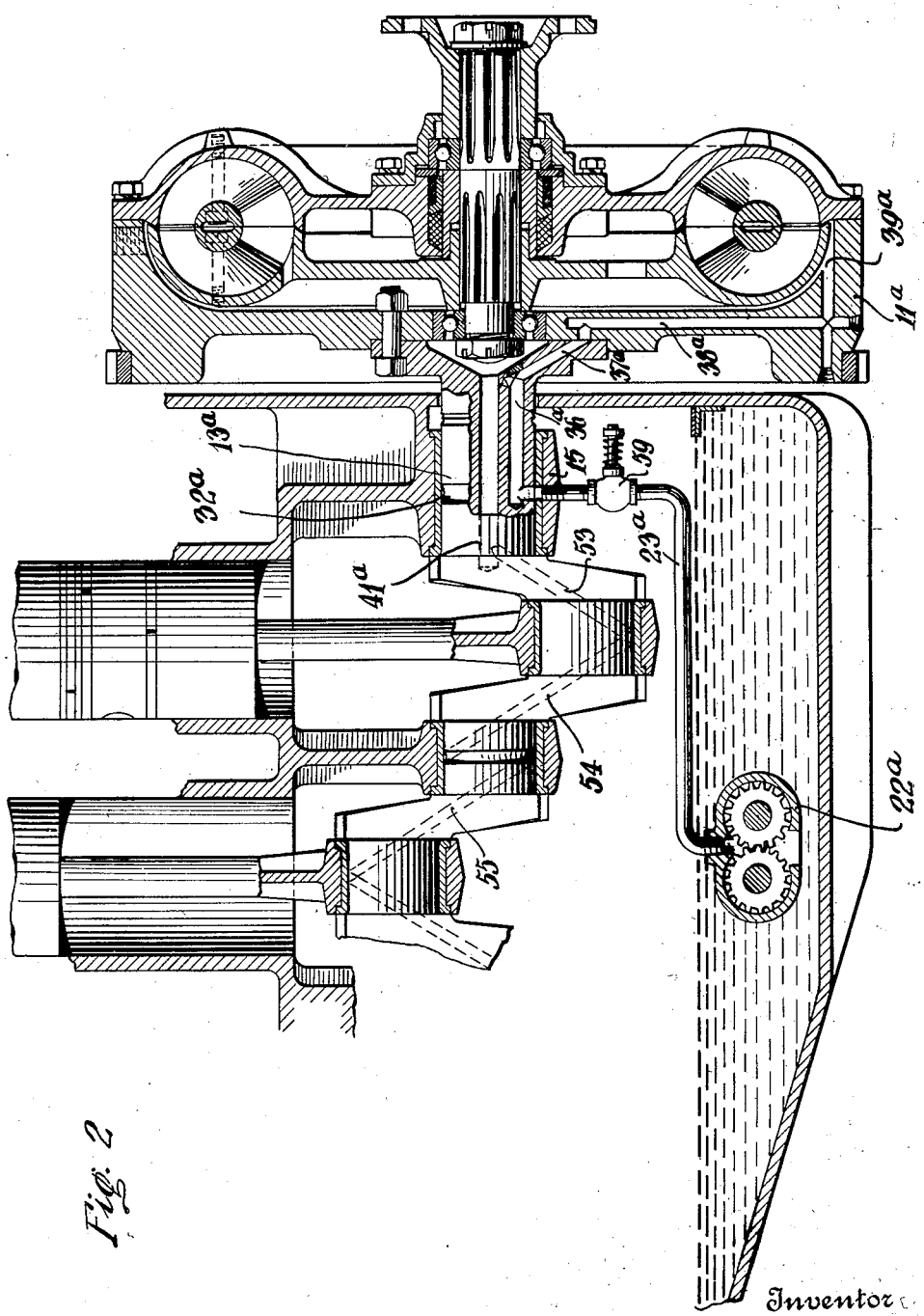
Fig. 2 is a central longitudinal section similar to Fig. 1, but illustrating a second form of my invention.

It is important that the oil in flowing to the transmitter does not pass along the bearing surface of the crank shaft and therefore the delivery is not dependent on the tightness or looseness of such bearing. The oil in returning from the transmitter may go directly to the bearing surfaces to lubricate them if desired. The bearing of the crank shaft may serve as the collar around the shaft and encircling the annular supply passage if desired. In Fig. 2 I have shown a construction embodying these features.

In the construction illustrated in Fig. 2 the main bearing 15 serves also as the collar or ring on the crank shaft. At its inner surface it is provided with an annular oil passage 32ᵃ which is illustrated as a groove in the crank shaft. The oil is delivered to the groove through a pipe 23ᵃ from the pump 22ᵃ. The oil may flow from the groove along the bearing surface of the shaft to lubricate the latter and also through passages 36ᵃ, 37ᵃ, 38ᵃ, and 39ᵃ to the interior of the transmitter as in Fig. 1. Instead of lubricating the other bearings by oil delivered through other branch pipes from the pump, I lubricate them with oil on its way back from the transmitter to the crank case. The passage 41ᵃ is shown as closed at the end farthest from the transmitter, but connects with a series of passages 53, 54, 55, etc., in the crank shaft and its cranks to lubricate the crank shaft and connecting rod bearings of the crank shaft 13ᵃ.

To avoid the building up of pressure in the transmitter, I have provided the pipe 23ᵃ with a spring controlled pressure or relief valve 59.

In the form of my invention illustrated in Fig. 3, the transmitter is substantially the same as shown in Figs. 1 and 2, but the oil or liquid is supplied thereto through the driven rather than the driving shaft. The oil is supplied through a pipe 60 which may be connected with the pump of the lubricating system or with any other suitable source of supply. The oil passes through the pipe 60 and a spring controlled pressure or relief valve 61 therein to the inner surface of a ring or collar 62 embracing a member 63 which turns therein and is keyed to the driven shaft 14ᵇ to transmit power to the transmission of the machine. The member 63 is shown as formed with a circumferential enlargement or flange open at its outer face to receive an inwardly projecting portion of the ring 62 and to provide an annular passage 64 with which the pipe 60 connects. The annular passage 64 connects with the surface of the shaft 14ᵇ through one or more bores or passages 65 and at this point the shaft 14ᵇ is provided with an annular groove 66 which connects with a radial bore 67 extending inwardly to a longitudinal bore 68.

To avoid leakage between the ring 62 and the member 63 annular washers 69 of U-shaped cross-section are placed at opposite sides of the chamber 64 with the openings of the U-shaped washers facing each other so that the pressure of the oil tends to spread the washers. From the axial passage 68, the oil passes through a generally radial passage 70 to an inner chamber of the transmitter and from there outwardly into the annular circulating chamber including the passages between the blades or vanes of the transmitter. The oil which escapes from the outer periphery of the outer circulating chamber passes around the outer surface of the driven member and through the bearing 42 to an axial passage in the crank shaft 13ᶜ and may flow from there directly into the crank case as in Fig. 1 or to the several bearing surfaces as in Fig. 2. The pipe 60 may be a branch from the oil pump as in Fig. 1 or the main line from the oil pump in Fig. 2.

Having thus described my invention, what I claim is new and desire to secure by Letters Patent is:

1. In combination, an internal combustion engine having a crank shaft, bearings therefor, a hydraulic power transmitter coupled to said crank shaft, an oil pump, means for delivering oil from said pump to said bearings, and means independent of said bearings for conducting pumped oil to said transmitter to serve as the drive fluid thereof.

2. In combination, an internal combustion engine having a crank shaft, bearings therefor, and a lubricating system having a pump, a hydraulic power transmitter coupled to said crank shaft, means independent of said bearings for conducting oil from the lubricating system to said transmitter to serve as the drive fluid thereof, and means for conducting oil from the said transmitter through the crank shaft to the lubricating system.

3. In combination, an internal combustion engine including a crank shaft, bearings therefor, and a lubricating system having a pump, a hydraulic transmitter coupled to said engine, a driven shaft coupled to said transmitter, and means independent of said bearings for conducting oil from said lubricating system through one of said shafts to the interior of said transmitter to serve as the drive fluid therefor.

4. In combination, an internal combustion engine having a crank shaft, bearings therefor, and a lubricating system for said bearings, a hydraulic transmitter coupled to said engine, a driven shaft connected with said hydraulic transmitter, and means for conducting oil from said system to said transmitter to serve as the drive fluid therefor, said conducting means including an annular oil chamber around one of said shafts independent of the bearings thereof and a passage in said shaft communicating with said annular oil chamber.

5. In combination, an internal combustion engine having a crank shaft, bearings therefor, a crank case, an oil pump, means for conducting oil from said oil pump to said bearings, a power transmitter, and means independent of the first mentioned means for conducting oil from said oil pump to said transmitter, and means for conducting oil from said transmitter through said crank shaft to said crank case.

6. In combination, an internal combustion engine having a crank shaft, bearings therefor, a crank case, an oil pump, means for conducting oil from said oil pump to said bearings, a power transmitter and means independent of the first mentioned means for conducting oil from said oil pump to said transmitter including an annular oil chamber around said shaft, and a passage through said crank shaft, and means to return oil from said transmitter to the crank case.

7. In combination, an internal combustion engine having bearings, and a lubricating system including connections with said bearings, a hydraulic transmitter coupled to said engine, and means independent of said connection with the bearings, for conducting oil from said system to said transmitter.

Signed at Pontiac, in the county of Oakland and State of Michigan, this 7th day of June, A. D. 1927.

GUSTAV A. KLIMEK.